Figure 3:
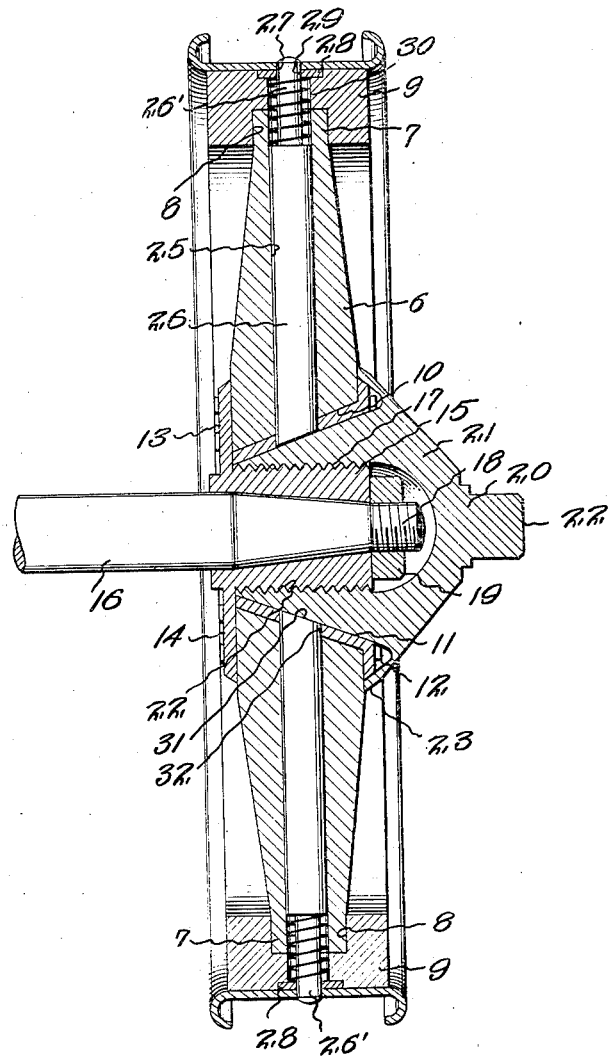

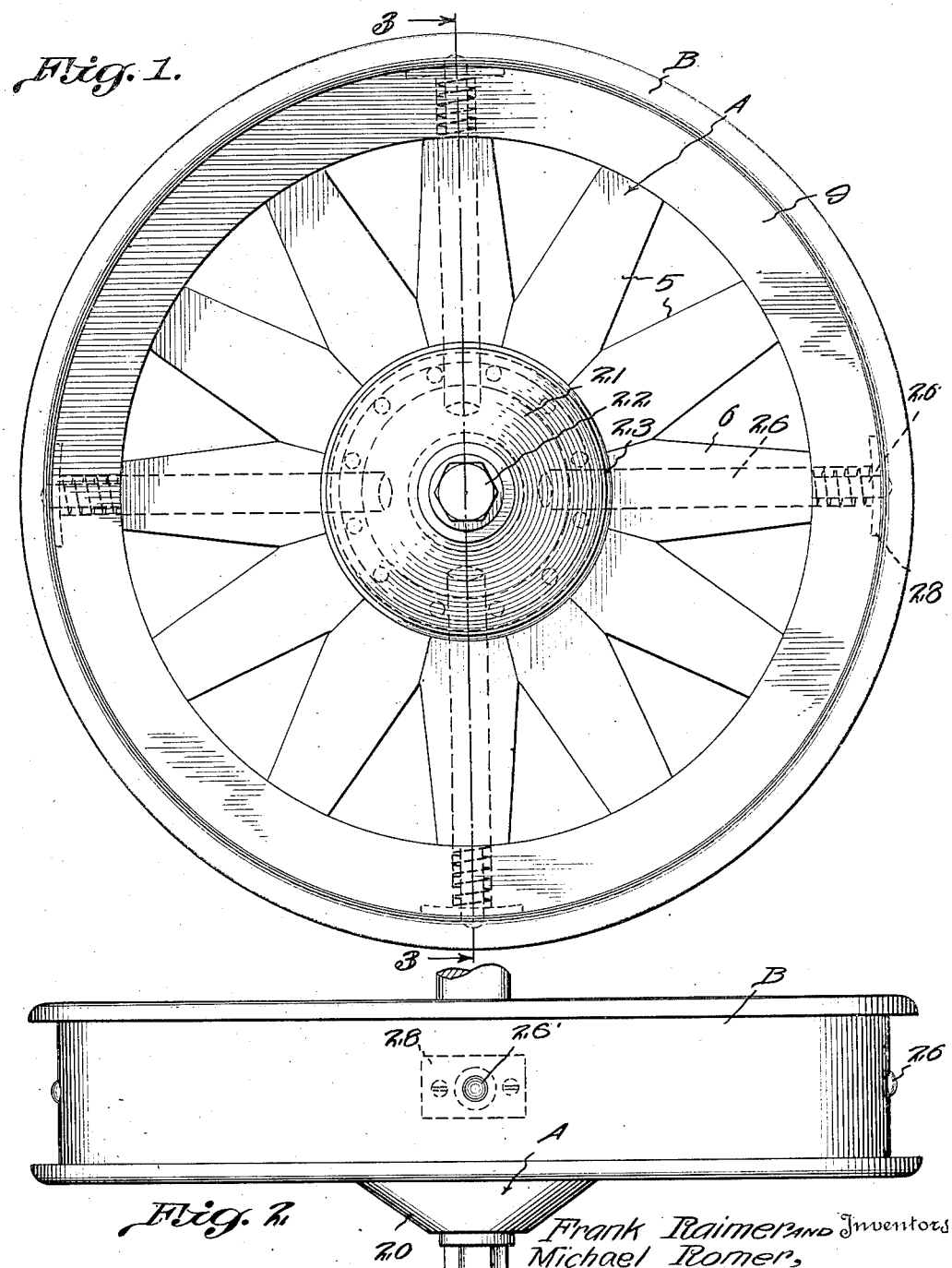

Patented Dec. 29, 1925.

1,567,464

UNITED STATES PATENT OFFICE.

FRANK RAIMER AND MICHAEL ROMER, OF ADAMS, MASSACHUSETTS.

WHEEL.

Application filed February 17, 1925. Serial No. 9,846.

*To all whom it may concern:*

Be it known that we, FRANK RAIMER and MICHAEL ROMER, citizens of the United States, residing at Adams, in the county of Berkshire and State of Massachusetts, have invented certain new and useful Improvements in Wheels, of which the following is a specification.

This invention appertains to vehicle wheels and more particularly a novel wheel for automobiles.

The primary object of the present invention is to provide novel means for detachably holding a demountable rim upon the felly of the wheel, the means permitting the removing and the replacing of the rim on the felly with the adjusting of a single operating member.

Another object of the invention is to provide novel means for permitting the quick association of a demountable rim upon the felly of the vehicle wheel, the means entirely eliminating the necessity of providing a plurality of holding lugs and the like.

A further object of the invention is to provide a novel device for holding a demountable rim upon a vehicle wheel embodying a plurality of locking bars slidably associated with the wheel for engaging the rim, and novel means for synchronously adjusting said bars.

A still further object of the invention is the provision of a novel device for firmly holding a demountable rim upon the vehicle wheel felly embodying a single hub cone for operating a plurality of locking bars for engaging the rim, the locking bars being slidably associated with certain of the wheel spokes and with the felly.

A still further object of the invention is to provide an improved device of the above character, which will be durable and efficient in use, one which will be simple and easy to manufacture, and which can be incorporated with a vehicle wheel at a small cost.

With these and other objects in view, the invention consists in the novel construction, arrangement and formation of parts, as will be hereinafter more specifically described, claimed, and illustrated in the accompanying drawings, in which drawings:

Figure 1 is an elevation of the wheel constructed in accordance with this invention, Figure 2 is an edge view of the same, Figure 3 is a diametric section taken through the wheel on the line 3—3 of Figure 1 looking in the direction of the arrows.

Referring to the drawing in detail, wherein similar reference characters designate corresponding parts throughout the several views, the letter A generally indicates the improved wheel and B a demountable rim, which is adapted to be associated therewith.

The wheel A comprises a plurality of radiating spokes 5 and 6. The outer ends of the spokes 6 terminate in tenons 7, which are fitted within suitable sockets 8 in the wheel felly 9. The inner terminals of all of the spokes are beveled as at 10 for the reception of a cone shaped sleeve 11. One edge of the sleeve 11 is provided with an annular flange 12 for engaging the side faces of the spokes and the opposite faces of the spokes are engaged by a flange plate 13. This flange plate 13 can be connected with the flange 12 of the sleeve 11 by suitable bolts 14 if desired. Formed on the inner face of the flange plate 13 is the inner extending bearing or box 15 for receiving the axle end 16. This axle bearing 15 is disposed axially within the sleeve 11 and has its outer face provided with threads 17 for a purpose, which will be hereinafter more fully described. The axle 16 can have its outer end reduced and threaded, as at 18 in the ordinary manner for receiving the hub nut 19 for engaging the bearing or axle box 15. In accordance with this invention a novel hub cap 20 is provided. This hub cap 20 includes a cone shaped body 21 provided with an internally threaded bore 22 to permit the same to be threaded on the axle bearing 15 in intimate engagement with the inner face of the sleeve 11. The hub cap 20 has its outer face provided, at the axial center thereof, with a polygonal shaped extension 22 to permit the easy turning thereof by a wrench or the like. If preferred an annular flange 23 can be provided on the hub cap for completely housing the flange 12 of the sleeve 11, when the same is in place.

The spokes 5 are of the usual construction with the exception of the beveled inner end thereof, while the spokes 6 are provided with longitudinally extending bores 25 for receiving locking bars 26. These locking bars 26 function as means for holding the demountable rim B in place on the felly and have their outer ends reduced as at 26' for engaging in suitable sockets or openings 27 formed in the rim and felly. The sockets 8 formed in the felly 9 for receiving the tenons 7 of the spokes 6 are reduced in diameter and continued through the felly to permit the reduced end 26' of the locking bars to extend therethrough. The outer face of the felly has countersunk therein plates 28 for overlying the sockets 8 and these plates are provided with guide openings 29 for receiving the reduced ends of the locking bars. Expansion springs 30 are coiled about the reduced ends 26' of the locking bars and have their opposite ends bearing respectively against the plates 28 and the shoulder formed by the reducing of the locking bars and these springs normally function to force the locking bars inward and the reduced ends thereof out of engagement with the rim to permit the easy removing thereof from off of the felly. The inner ends of the locking bars are beveled as at 31 and extend through suitable openings 32 formed in the hub sleeve 11. When the hub cap 20 is threaded on the axle bearing 15, it is obvious that the locking bars 26 will be forced outward against the tension of the springs owing to the cone shaped body 21 of the hub cap.

By this construction, it is merely necessary to adjust the hub cap 20 when it is desired to remove or place the rim upon the felly.

Changes in details may be made without departing from the spirit or the scope of this invention, but:—

What we claim as new is:

1. The combination with a vehicle wheel including a tapered hub sleeve, a plurality of radiating spokes associated with the hub sleeve, a felly carried by the spokes, and a rim detachably fitted upon the felly having sockets formed therein, of means for locking the rim upon the felly including a plurality of locking bars slidably associated with certain of the spokes and adapted to fit within the sockets formed in the rim, spring means engaging the locking bars normally urging the same out of engagement with the sockets, and means associated with the hub sleeve for synchronously adjusting the locking bars toward the rim against the tension of said spring means.

2. The combination with a vehicle wheel including a hub sleeve of frusto-conical shape, a plurality of radiating spokes, said spokes being provided with longitudinal ways, and a felly connected with the spokes having openings therein alining with the ways formed in the spokes, retaining plates connected with the felly and having openings therein, and a rim detachably fitted upon the felly having sockets adapted to aline with the openings in the plates, and means for detachably holding the rim on the felly including a plurality of locking bars slidably mounted in the ways of the spokes having reduced outer terminals adapted to extend through the openings in the plates into the sockets formed in the rim, expansion springs engaging the plates and the bars for normally urging the bars out of engagement with the sockets in the rim, and an axle bearing axially fitted within the hub sleeve, and an adjusting cone threaded on the axle bearing engaging the locking bars.

In testimony whereof we affix our signatures.

FRANK RAIMER.
MICHAEL ROMER.